United States Patent Office 2,830,054
Patented Apr. 8, 1958

2,830,054

NEW PYRIMIDINE DERIVATIVES

Walter Hepworth, Manchester, England, assignor to Imperial Chemical Industries Limited, London, England, a corporation of Great Britain No Drawing. Application June 21, 1955
Serial No. 517,056

Claims priority, application Great Britain July 9, 1954

12 Claims. (Cl. 260—256.4)

This invention relates to new pyrimidine derivatives and more particularly it relates to new pyrimidine derivatives which are useful in chemotherapy as antiprotozoal agents, more particularly as antimalarials.

According to the invention we provide the said new pyrimidine derivatives which are of the formula:

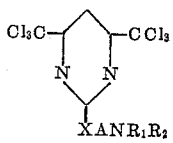

wherein X stands for oxygen or the group $NR_3$ wherein $R_3$ stands for hydrogen or an alkyl radical, A stands for a hydrocarbon linking group, and $R_1$ and $R_2$ stand for hydrogen or for alkyl radicals or may be united to form, together with the adjacent nitrogen atom, a heterocyclic group.

We have found that the said new pyrimidine derivatives of the stated formula possess useful antiprotozoal action in experimental infections in animals and particularly we have found that they possess useful antimalarial action against experimental infections in mice and in chicks.

According to a further feature of the invention we provide a process for the manufacture of the said new pyrimidine derivatives which comprises reacting a pyrimidine derivative of the formula

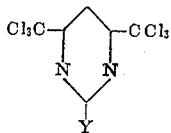

wherein Y stands for a halogen atom, with a compound of the formula $HXANR_1R_2$ wherein X, A, $R_1$ and $R_2$ have the meaning stated above.

The 2-halo-4,6-bistrichloromethyl pyrimidine used herein as the starting material may be obtained in the manner described in copending U. S. application, Serial No. 517,055, filed on even date herewith.

The reaction may be carried out optionally in the presence or absence of an inert organic solvent or diluent and in the presence of an acid binding agent. The said acid binding agent may be for example a tertiary organic base for example triethylamine or it may be an excess of the amine used as starting material in the process of manufacture.

The invention is illustrated but not limited by the following examples in which the parts are by weight:

Example 1

3.5 parts of 2-chloro-4:6-bistrichloromethylpyrimidine are dissolved in 10 parts of ether and the solution is added to a solution of 1.8 parts of β-dimethylaminoethylamine in 10 parts of ether cooled to 20° C. The mixture is then washed with water and dried. The ether is then distilled and the residual 2-(β-dimethylaminoethylamino)-4:6-bistrichloromethylpyrimidine is crystallised from petroleum ether of B. P. 40–60° C. and is thus obtained as pale yellow crystals of M. P. 91–2° C.

When the 1.8 parts of β-dimethylaminoethylamine used as starting material are replaced by 2.1 parts of γ-dimethylaminopropylamine there is thus obtained 2-(γ-dimethylaminopropylamino) - 4:6 - bitrichloromethylpyrimidine, M. P. 96° C. after crystallisation from petroleum ether of B. P. 40–60° C.

Example 2

7 parts of 2-chloro-4:6-bistrichloromethylpyrimidine are added to 6.4 parts of 2-amino-5-diethylaminopentane cooled to below 15° C. The mixture is then added to 80 parts of ether and washed with water. It is then dried and the ether is distilled. The residue consists of 2-(α-methyl-δ-diethylaminobutylamino)-4:6-bis-trichloromethylpyrimidine, M. P. 35.7° C.

Example 3

A mixture of 3.5 parts of 2-chloro-4:6-bistrichloromethylpyrimidine, 1 part of triethylamine and 1.9 parts of γ-di-n-butylaminopropylamine in 30 parts of ether is cooled to below 20°. The mixture is kept for one hour at this temperature and is then washed with water and dried. The ether is then distilled in vacuo and the residue 2 - (γ - di - n - butylaminopropylamino)-4:6-bistrichloromethylpyrimidine is so obtained as an amber-coloured gum.

Example 4

3.5 parts of 2-chloro-4:6-bistrichloromethylpyrimidine are dissolved in 10 parts of ether and the solution is added to a solution of 2.6 parts of β-diethylaminoethylamine in 10 parts of ether cooled to below 20° C. The mixture is then washed with water and dried. Dry ethereal hydrochloric acid is then added to the mixture and the mixture so obtained is filtered. The solid residue is washed with ether and dried and there is thus obtained 2-(β-diethylaminoethylamino) - 4:6 - bistrichloromethylpyrimidine hydrochloride, M. P. 188–190° C.

When the 2.6 parts of β-diethylaminoethylamine used as starting material are replaced by 2.5 parts of β-piperidinoethylamine or by 2.6 parts of γ-diethylaminopropylamine or by 2.6 parts of β-diethylamino-N-methylethylamine, there is thus obtained respectively 2-(β-piperidinoethylamino)-4:6-bistrichloromethylpyrimidine hydrochloride, M. P. 214–216° C., 2-(γ-diethylaminopropylamino)-4:6-bistrichloromethylpyrimidine hydrochloride, M. P. 134–136° C. and 2-(β-diethylamino-N-methylethylamino)-4:6-bistrichloromethylpyrimidine hydrochloride, M. P. 146° C.

What I claim is:

1. Pyrimidine derivatives of the formula:

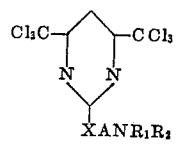

wherein X stands for the group $NR_3$, wherein $R_3$ is selected from hydrogen and methyl, A stands for an alkyl radical of up to five carbon atoms, and $R_1$ and $R_2$ are selected from the group consisting of hydrogen, alkyl radicals containing up to four carbon atoms, and a piperidino radical formed by joining $R_1$ and $R_2$ together with the adjacent nitrogen atom.

2. 2-(β-dimethylaminoethylamino) - 4:6 - bistrichloromethylpyrimidine.

3. 2-(γ - dimethylaminopropylamino)-4:6-bistrichloromethylpyrimidine.

4. 2-(α-methyl - δ - diethylaminobutylamino)-4:6-bis-trichloromethylpyrimidine.

5. 2-(γ - di - n - butylaminopropylamino) - 4:6 - bis-trichloromethylpyrimidine.

6. 2-(β - diethylaminoethylamino) - 4:6 - bistrichloromethylpyrimidine hydrochloride.

7. Process for the manufacture of pyrimidine derivatives of the formula:

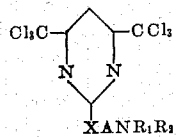

XANR₁R₂ wherein X stands for the group $NR_3$ wherein $R_3$ is selected from hydrogen and methyl, A stands for an alkyl radical of up to five carbon atoms, and $R_1$ and $R_2$ are selected from the group consisting of hydrogen, alkyl radicals containing up to four carbon atoms, and a piperidino radical formed by joining $R_1$ and $R_2$ together with the adjacent nitrogen atom, said process comprising the step of reacting a pyrimidine derivative of the formula:

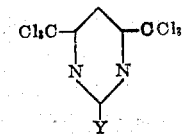

wherein Y stands for a chlorine atom, with a compound of the formula $HXANR_1R_2$ wherein X, A, $R_1$ and $R_2$ have the meaning stated above.

8. The process of claim 4 wherein said reaction is carried out in the presence of an inert organic liquid medium.

9. Process as claimed in claim 7 wherein there is used an acid binding agent.

10. Process as claimed in claim 9 wherein the acid binding agent is a tertiary organic base.

11. Process as claimed in claim 10 wherein the tertiary organic base is triethylamine.

12. Process as claimed in claim 9 wherein the acid binding agent is an excess of the compound of the formula $HXANR_1R_2$ wherein X, A, $R_1$ and $R_2$ have the meaning stated in claim 7.

No references cited.